March 14, 1939.  T. S. CASNER  2,150,153
MAGNETIC MOTOR FOR ELECTRIC RAZORS OR THE LIKE
Filed Feb. 12, 1938    2 Sheets-Sheet 1

INVENTOR.
Thaddeus S. Casner
BY
Joseph F. O'Brien
ATTORNEY.

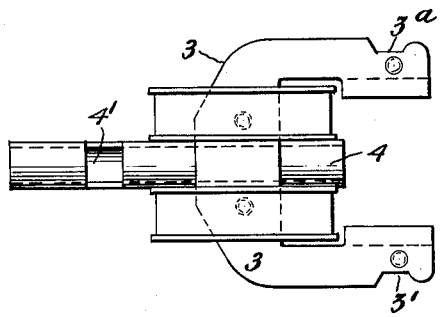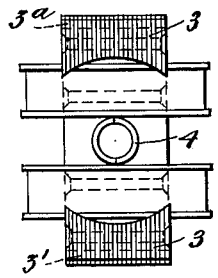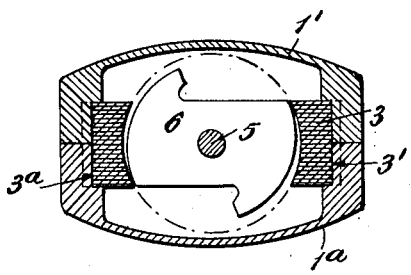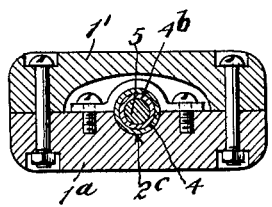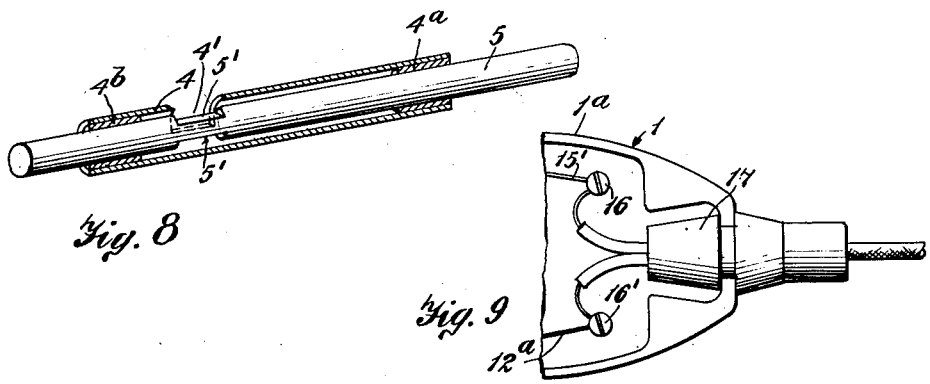

Patented Mar. 14, 1939

2,150,153

UNITED STATES PATENT OFFICE 2,150,153

MAGNETIC MOTOR FOR ELECTRIC RAZORS OR THE LIKE

Thaddeus S. Casner, Plainfield, N. J., assignor to Casner Patents, Inc., a corporation of Delaware Application February 12, 1938, Serial No. 190,167

7 Claims. (Cl. 172—36)

This invention relates to improvements in magnetic motors for electric razors or the lke.

Magnetic motors heretofore used for electric razors or in the handles of other small tools, such as vibrators, dental apparatus and other hand tools have conventionally embodied a shaft, a field member preferably of bi-polar type with suitable coils and oppositely disposed end surfaces, an unwound armature mounted on the shaft and rotatable between said end surfaces of the field member, and a circuit breaker operable by the shaft, all of said parts being assembled in a suitable handle or casing and many of them being independently supported therein, and it is one of the objects of this invention to provide a motor construction or assemblage of motor parts that will constitute a unit irrespective of the casing; to provide a motor construction that, in manufacture, may be handled as a separate unit and which will be separable as a unit from the handle or casing for replacement or repair; to provide a unitary motor construction that may be assembled, tested and, if desired, sold separately; to provide a novel arrangement of parts composed of a motor-skeleton or frame with subsidiary parts built or assembled on the same, and to provide a motor construction that will be capable of speedy and economical manufacture or fabrication and that will be efficient.

Another object of my invention is to provide a casing embodying an efficient support for my unitary motor and particularly to provide a casing with surfaces that will properly enclose and encase the said parts or members, when the same are applied thereto, and which will also preferably have a keying or locking connection with my unitary motor.

Another object of my invention is to utilize, as a skeleton-frame for my unit, an axial tube combined with a special arrangement of the field member within and by which the shaft and other members may be connected and supported.

Another object of my invention is, in a device of the character specified, to provide a skeleton-frame for said motor unit comprising a field member having a body portion extending transversely across the longitudinal axis of the motor and oppositely-disposed and spaced pole-surfaces extending rearwardly therefrom combined with a tubular member connected axially with the body portion of said field member and forming a support for an operating shaft having an armature fixed at one end thereof, a circuit-breaker operatively-connected thereto intermediate its ends and means at the opposite end for actuating a razor or the like.

Still another object of my invention is, in a device of the character specified, to combine a casing having side-supporting ledges, keying projections and an axial supporting or bearing surface with a motor unit embodying a skeleton-frame comprising a laminated field element embodying a transverse body-portion and spaced pole-surfaces or legs extending rearwardly and having cooperating side notches, an axially-disposed tube supported and fastened at one end in said body portion of the laminated field element and supported at its opposite end in said axial bearing surface of the casing, a shaft supported in said tube and projecting rearwardly of said field body portion to position an armature between said rearwardly-projecting pole surfaces and extending forwardly within said tube through said body portion of the field member to provide means within the casing for actuating a circuit breaker.

Still another object of my invention is to provide an axial tube with a cut-away portion or opening intermediate its ends to provide access to the shaft for actuation of a circuit breaker.

Still another object of my invention is to utilize an axial tube having oilless-bearing sleeves disposed at opposite ends thereof to firmly support a shaft for rotation without oil or other lubrication.

Still another object of my invention is to provide a compact unitary motor composed of few parts which will be capable of quick and ready assembling and insertion within a casing and which will minimize the cost factors both for fabricating of the parts, for assembling the same into units and for fastening within a casing.

With these and other objects in view, the invention comprises the combination of members and arrangement of parts so combined as to co-act and co-operate with each other in the performance of the functions and the accomplishment of the results herein contemplated, and comprises in one of its adaptations the species or preferred form illustrated in the accompanying drawings, in which:

Fig. 1 is a top or plan view of a motor, embodying my invention, with the upper half of the casing removed;

Fig. 1ᵃ is a diagrammatic view of the wire end circuit for the motor shown in Figs. 1 and 2;

Fig. 4 is a view in plan of a combined shaft-supporting unit and field member;

Fig. 5 is an end elevation of the members shown in Fig. 4;

Fig. 6 is a view in section on the line 6—6 of Fig. 1, looking in the direction of the arrows;

Fig. 7 is a section on the line 7—7 of Fig. 1, looking in the direction of the arrows;

Fig. 8 is a view in perspective of my shaft-supporting tube removed from its position in the field member, and Fig. 9 is a fragmentary view of a modified form of wire connection at the rear end of the motor.

Figure 1:
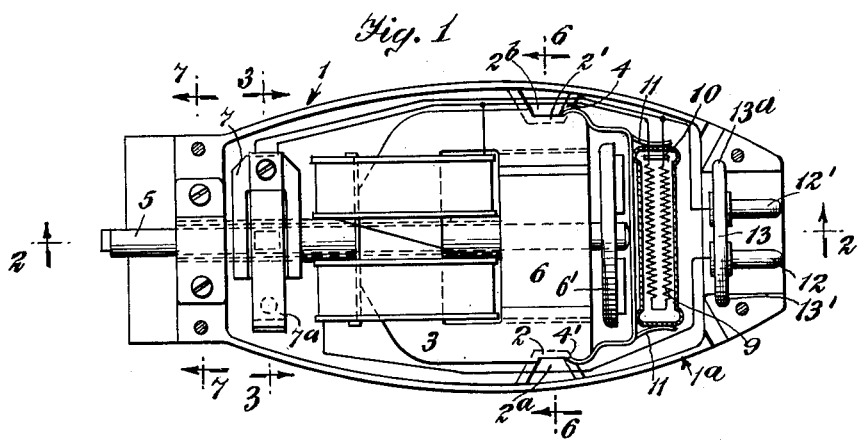

Referring now to these drawings which illustrate a preferred embodiment of my invention, 1 indicates a casing preferably composed of a suitable condensation product and formed in two halves 1', 1ª respectively. One half of said casing is preferably provided intermediate its ends with supporting ledges or contact surfaces 2, 2' and inwardly projecting keys 2ª, 2ᵇ extending inwardly of the edges of said casing and upwardly from said ledges, and the forward end of said half has a semi-cylindrical support 2ᶜ, while the other half of the casing will have similar keys and contact surfaces and will constitute a separable cover for the motor.

In accordance with my invention, I initially assemble a complete motor unit on a skeleton frame and I then insert this complete motor unit into the casing. As illustrated, my skeleton frame comprises a field member 3 and an axially-disposed tube 4, and the bottom part of the skeleton will rest upon the ledges 2, 2' while the projections 2ª, 2ᵇ will enter side notches 3', 3ª in the side edges of the field member 3 which, as aforesaid, comprises a part of my said skeleton frame. My preferred form of field member 3 is composed of laminated metal and comprises a transverse body-portion and spaced pole-surfaces or legs extending rearwardly and having the cooperating side notches 3', 3ª, while the axially-disposed tube 4 has one end fastened axially in said body portion so as to be supported thereby and its opposite end is supported in said axial bearing surface 2ᶜ of the casing. I preferably utilize an axial tube having oilless-bearing sleeves 4ᵇ, 4ª, disposed at opposite ends thereof and I support therein a shaft 5 for rotation without oil or other lubrication. The shaft 5 so supported in said tube projects rearwardly of said field body portion and between the spaced pole surfaces so as to position an armature 6 between said rearwardly-projecting pole surfaces. Said shaft extends forwardly within said tube through said body portion of the field member and to the forward end of the casing where it is provided with suitable connecting means for operating a razor or like tool, and also to provide means within the tube for actuating a circuit breaker. As illustrated, the axial tube 4 is cut-away or provided with an opening 4' intermediate its ends to enable access to the shaft by the moving part of a circuit breaker 7.

As illustrated, the portion of the shaft beneath said opening is partially cut away at opposite portions of its circumference to provide, at opposite sides of the cut-away portions, double cam surfaces 5' and the circuit breaker 7 is so positioned that its body portion hugs said tube over and around said opening and is fastened thereto by set screw 7ᵇ so that one of the arms 7', 7ª carries a block b which projects through said opening to contact with said double cam surfaces of the shaft so that upon rotation of the shaft said surfaces 5' contact with and move the blade or arm 7' of the circuit breaker 7, twice during each rotation, into contact with the arm 7ª, thus making and breaking an electric circuit through the coils 8, 8' which, in the embodiment shown, are initially mounted on the body portion of the field member and locked in place thereon by connection of the axial tube thereto.

A hand-actuated starting disk 6' is mounted on the shaft 5 adjacent to the armature and extends above the casing to enable an initial turning or rotation of the armature and the making and breaking of an electric circuit through the coils 8, 8'.

Figure 2:
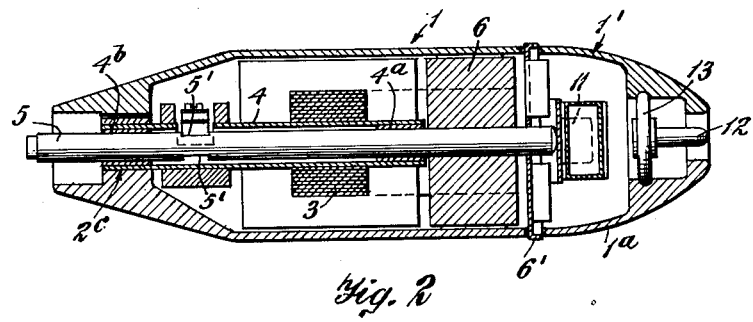
Fig. 2 is a section on the line 2—2 of Fig. 1, looking in the direction of the arrows.
Figure 3:
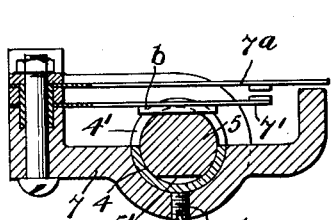
Fig. 3 is a section on the line 3—3 of Fig. 1, looking in the direction of the arrows.
Figure 1A:
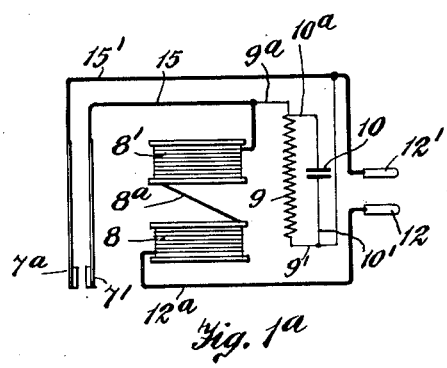

In one embodiment of my invention shown in Figs. 1 to 8, I utilize a resistance element 9 and a condenser 10 which are preferably connected to and mounted on the rear end of the field member by clips 11, 11', and terminals 12, 12' are mounted in a partition member 13 removably mounted at the rear of the casing in notches 13', 13ª.

The electric circuit for the embodiment shown in Figs. 1 to 8 is as follows:

The current flows from terminal 12 by wire 12ª to and through coil 8 thence by wire 8ª to and through coil 8' to wire 15 and blade or arm 7' of the circuit breaker 7, thence to blade or arm 7ª and through wire 15' to terminal 12'.

The resistance element 9 is thrown across the circuit breaker 7 through connecting the end thereof by the wire 9ª with the wire 15 and through connecting the opposite end of said resistance by means of the wire 9' to the wire 15'. The condenser 10 is thrown across the resistance by connecting wire 10' with wire 9' and by connecting the opposite wire 10ª with wire 9ª.

In Fig. 9 I have shown, in fragmentary plan, a slightly modified form of my invention in which instead of the terminals 12, 12', the ends of the wires are connected to binding posts 16, 16' within the casing and the wires are then led through a removable double rubber plug 17 to a suitable source of supply. In other respects, this construction is similar to that shown and described in relation to Figs. 1 to 8 inclusive.

Having described my invention, I claim:

1. An electro-magnetic motor unit for electric razors and the like embodying, in combination, a skeleton-frame comprising a polar field member and a shaft-supporting tubular member connected thereto, said polar field member having a body portion provided with pole-surfaces extending in one direction and said shaft-supporting tubular member projecting from said body portion in a direction opposite to said pole-surfaces, an operating shaft supported in said tubular member, an armature mounted on said shaft and rotatable between said pole-surfaces of the field member, a circuit breaker, means on said shaft for operating said circuit breaker, windings on said field member, an electric circuit connected with said windings, and means on said shaft for actuating a razor or the like.

2. An electro-magnetic motor for electric razors and the like embodying, in combination, a motor unit comprising a skeleton frame composed of a polar field member and a shaft-supporting tubular member connected thereto, said polar field member having a body portion provided with oppositely-disposed and spaced pole-surfaces extending therefrom in one direction and said shaft-supporting tubular member projecting from said body portion in a direction opposite to said pole-surfaces, an operating shaft supported in said tubular member, an armature mounted on said shaft and rotatable between said pole-surfaces of the field member, a circuit breaker, means on said shaft for operating said circuit breaker, windings on said field member, an electric circuit connected with said windings, means on said shaft for actuating a razor or the like, a casing fitting and readily separable from said motor unit and means in said casing for releasable supporting said unit therein.

3. An electro-magnetic motor for electric razors and the like embodying, in combination, a motor unit comprising a skeleton frame composed of a polar field member and a shaft-supporting tubular member connected thereto, said polar field member having a body portion provided with oppositely-disposed and spaced pole-surfaces extending therefrom in one direction and said shaft-supporting tubular member projecting from said body portion in a direction opposite to said pole-surfaces, an operating shaft supported in said tubular member, an armature mounted on said shaft and rotatable between said pole-surfaces of the field member, a circuit breaker, means on said shaft for operating said circuit breaker, windings on said field member, an electric circuit connected with said windings, means on said shaft for actuating a razor or the like, a casing fitting and readily separable from said motor unit, means in said casing for releasably supporting said unit therein comprising a bearing surface at its forward end for engagement with said tubular member and supporting ledges intermediate its ends for engagement with said field member to provide, within the casing, a three-point supporting contact for the motor unit.

4. An electro-magnetic motor for electric razors and the like embodying, in combination, a motor unit comprising a skeleton frame composed of a polar field member and a shaft-supporting tubular member connected thereto, said polar field member having a body portion provided with oppositely-disposed and spaced pole-surfaces extending therefrom in one direction and said shaft-supporting tubular member projecting from said body portion in a direction opposite to said pole-surfaces, an operating shaft supported in said tubular member, an armature mounted on said shaft and rotatable between said pole-surfaces of the field member, a circuit breaker, means on said shaft for operating said circuit breaker, windings on said field member, an electric circuit connected with said windings, means on said shaft for actuating a razor or the like, a casing fitting and readily separable from said motor unit, means in said casing for releasably supporting said unit therein comprising a bearing surface at it forward end for engagement with said tubular member and supporting ledges intermediate its ends for engagement with said field member to provide, within the casing, a three-point supporting contact from the motor unit, said casing also being provided intermediate its ends with keying projections and said field member being provided with keying notches cooperating with said keying projections of the casing.

5. An electro-magnetic motor unit for electric razors and the like embodying, in combination, a skeleton-frame comprising a polar field member and a shaft-supporting tubular member connected thereto, said polar field member having a body portion provided with pole-surfaces extending in one direction and said shaft-supporting tubular member projecting from said body portion in a direction opposite to said pole-surfaces, an operating shaft supported in said tubular member, an armature mounted on said shaft and rotatable between said pole-surfaces of the field member, a circuit breaker, means on said shaft for operating said circuit breaker, windings on said field member, an electric circuit connected with said windings, means on said shaft for actuating a razor or the like, said tubular member having intermediate its ends an opening to provide access to said shaft, a cam portion on said shaft at said open portion of the tubular member, and said circuit breaker having one of its arms extending through said opening for operation by the cam portion of said shaft.

6. An electro-magnetic motor unit for electric razors and the like embodying, in combination, a skeleton-frame comprising a polar field member and a shaft-supporting tubular member connected thereto, said polar field member having a body portion provided with pole surfaces extending in one direction and said shaft-supporting tubular member projecting from said body portion in a direction opposite to said pole-surfaces, an operating shaft supported in said tubular member, an armature mounted on said shaft and rotatable between said pole-surfaces of the field member, a circuit breaker, means on said shaft for operating said circuit breaker, windings on said field member, an electric circuit connected with said windings, means on said shaft for actuating a razor or the like, said tubular member having adjacent to each of its opposite ends oilless-bearing sleeves to firmly support said shaft for rotation therein.

7. An electro-magnetic motor unit for electric razors and the like embodying, in combination, a skeleton-frame comprising a polar field member and a shaft-supporting tubular member connected thereto, said polar field member having a body portion provided with pole-surfaces extending in one direction and said shaft-supporting tubular member projecting from said body portion in a direction opposite to said pole-surfaces, an operating shaft supported in said tubular member, an armature mounted on said shaft and rotatable between said pole-surfaces of the field member, a circuit breaker, means on said shaft for operating said circuit breaker, windings on said field member, an electric circuit connected with said windings, and means on said shaft for actuating a razor or the like, a resistance member connected in said electric circuit across the circuit breaker and clips for releasably fastening said resistance member to said field member.

THADDEUS S. CASNER.